Patented Jan. 25, 1938

2,106,382

UNITED STATES PATENT OFFICE 2,106,382

PROCESS AND COMPOSITION FOR DYEING WITH ANILINE BLACK

Karl Schmidt, Krefeld, Germany

No Drawing. Application March 27, 1936, Serial No. 71,315. In Germany May 14, 1934

8 Claims. (Cl. 8—5)

My invention concerns a new process for the manufacture of aniline black on textile fibres, which is deep black and does not turn green, can easily be reserved and in the application of which the fibre remains protected from any weakening, and to new compositions for use in the said process.

It is known that a good black which does not turn green can be obtained when large quantities of salts of weak or easily oxidized acids, for example thiocyanic acid, and at the same time an organic catalyst are added to a customary aniline black bath which consists of an aniline salt, an oxidizing agent and a metal salt catalyst. By this process the fibre weakening occurring in the case of other known black processes is reduced.

It has been proved, however, that the application of such salts of protecting action in the printing of reserves under aniline black entails difficulties, because particularly in the case of dense patterns the black in the neighborhood of the reserves is badly developed and thus grey edges are produced around the reserved portions.

Since reserves under aniline black find considerable application, however, there is a great need for a process which allows of the printing of reserves under aniline black without halo formation, and without the fibre being attacked by the aniline black formation as is always the case to a considerable degree in the otherwise customary aniline black processes.

It is an object of this invention to provide such a process.

According to my new process the protecting salts are replaced by large quantities of other protecting substances which do not cause such a halo formation but on account of their capacity for oxidation and for binding the liberated acid prevent any damage to the fibre. Such substances are for example sugar, carbamide, or degradation products of albumen substances. It is immaterial for the effect whether the albumen substances are degraded more or less strongly and also by what process this is carried out.

Such substances have indeed in part already been recommended as protecting agents but according to the previously recommended methods in all cases only small quantities of these substances are employed obviously for the reason that it was feared that with large quantities the development of a good black would be prevented. The proposed small quantities have however from a practical point of view practically no protective effect whatever.

I have found that with the simultaneous application of protective substances such as sugar, carbamide, or degradation products of albumen substances and of suitable organic catalysts which are present in a definite quantity proportion with respect to the protective substances, a good black can also be attained when very large quantities of the protective substances are employed. Such large quantities can be added to the aniline black bath or printing colour that a complete protection of the fibre is guaranteed and thus the protective effect which can be obtained by the already known salts is further surpassed. In the presence of these large quantities of protective substances in addition the bath or printing colour becomes considerably more stable so that it is still quite capable of application even after standing for some days.

As organic catalysts are suitable aromatic amines, in particular diamines, such as p-phenylenediamine, benzidine, and dianisidine and further also diphenylamine and its derivatives. They are employed as additional catalysts together with the metal salt catalysts already present in every ordinary aniline black bath. It is advantageous to employ several of such organic catalysts simultaneously. Likewise with advantage several protective substances can be employed together.

For example, goods are prepared with a bath which contains 12 parts of aniline salt, 9 parts of sodium ferrocyanide or potassium ferrocyanide, 5 parts of sodium chlorate, 0.5 to 2 parts of p-phenylenediamine and 3 to 10 parts of degraded albumen or instead of the degraded albumen 10 to 25 parts of carbamide.

The goods can before or after preparing with this bath be printed with a suitable reserve, then steamed in the customary manner for 2 to 6 minutes, if desired treated with chromate and washed.

It is a further object of this invention to provide new compositions suitable for use in my new process.

Protective agents and organic catalysts can be combined to compositions which contain the two substances in a suitable proportion and it is only necessary to add this preparation to an ordinary aniline black printing colour or bath in order to impart thereto the desired valuable properties.

Suitable mixture proportions with the application for example of p-phenylenediamine, benzidine, dianisidine or diphenylamine as organic catalysts and degraded albumen as protective substance are 1 part of organic catalyst and 4 to 10 parts of degraded albumen. With the application of the above catalysts and carbamide as protective substance the mixture proportions are 1:15 to 1:30.

The additions according to my invention can, however, find application in the stated proportions also for any other known aniline black process for the purpose of preservation of the fibre, in which instead of ferrocyanides other heavy metal salts find application as catalysts, such as copper, iron, lead and vanadium salts and others and for processes in which the black is developed often without steaming but by slow oxidation at medium temperatures. The quantity of the protective substance must in all cases be so great that in the absence of an organic catalyst or metal catalyst the black colour is considerably deteriorated by the protecting substances; the quantity of the protecting substances amounts to at least about one quarter of the quantity of aniline salt employed.

What I claim is:—

1. In the processes of dyeing and printing textiles with aniline black, baths and printing colours comprising an aniline salt, an oxidizing agent, a heavy metal salt, at least one organic catalyst selected from the group consisting of p-phenylenediamine, benzidine, dianisidine and diphenylamine and a quantity, amounting to at least one quarter of the amount of the aniline salt employed, of at least one oxidizable and acid-binding substance selected from the group consisting of carbamide and degradation products of albumen substances.

2. In the dyeing and printing of textiles with aniline black, the step of treating the textile with a composition comprising an aniline salt, an oxidizing agent, a heavy metal salt, at least one aromatic diamino organic catalyst and a quantity, amounting to at least one-quarter of the amount of the aniline salt employed, of at least one oxidizable and acid-binding substance selected from the group consisting of carbamide and degradation products of albumen substances.

3. In the dyeing or printing of textiles with aniline black compositions containing an aniline salt, the step of carrying out the dyeing in the presence of a quantity amounting to at least one-quarter of the amount of the aniline salt employed, of at least one oxidizable and acid-binding substance selected from the group consisting of carbamide and degradation products of albumen substances.

4. A composition for application in aniline black baths and printing colours comprising an aromatic amine selected from the group consisting of p-phenlyenediamine, benzidine, dianisidine, and diphenylamine, and degraded albumen in the approximate proportion of 1:4 to 1:10 the quantity of aromatic amine and degraded albumen amounting to 25-200% of the amount of the aniline salt in the aniline black bath.

5. A composition for application in aniline black baths and printing colours comprising an aromatic amine selected from the group consisting of p-phenlyenediamine, benzidine, dianisidine, and diphenylamine, and carbamide in the approximate proportion of 1:15 to 1:30 the quantity of aromatic amine and carbamide amounting to 25-200% of the amount of the aniline salt in the aniline black bath.

6. A composition for application in aniline black baths and printing colours comprising p-phenylenediamine and degraded albumen in the approximate proportion of 1:4 to 1:10 the quantity of p-phenylenediamine and degraded albumen amounting to 25-200% of the amount of the aniline salt in the aniline black bath.

7. A composition for application in aniline black baths and printing colours comprising p-phenylenediamine and carbamide in the approximate proportion of 1:15 to 1:30 the quantity of p-phenylenediamine and carbamide amounting to 25-200% of the amount of the aniline salt in the aniline black bath.

8. A composition for application in aniline black baths and printing colours comprising dianisidine and carbamide in the approximate proportions of 1:15 to 1:30 the quantity of dianisidine and carbamide amounting to 25-200% of the amount of the aniline salt in the aniline black bath.

KARL SCHMIDT.